United States Patent [19]

Waters, Jr.

[11] 3,917,489

[45] Nov. 4, 1975

[54] CERAMIC COMPOSITION AND METHODS

[76] Inventor: John E. Waters, Jr., 1539 Buena Vista, Apt. 1, San Clemente, Calif. 92672

[22] Filed: June 10, 1974

[21] Appl. No.: 477,829

[52] U.S. Cl.................................. 106/110; 106/109
[51] Int. Cl.²......................................... C04B 11/10
[58] Field of Search ............ 106/110, 109, 39.5, 63, 106/DIG. 8

[56] References Cited
UNITED STATES PATENTS
2,433,429   12/1947   Charles................................. 106/63

FOREIGN PATENTS OR APPLICATIONS
630,268   10/1949   United Kingdom................. 106/109

OTHER PUBLICATIONS

The Condensed Chemical Dictionary, Eighth Edition, Van Nostrand Reinhold Copyright, 1971, p. 403.

Introduction to Whitewares, George Jackson MacLaren and Sons, London, 1969, pp. 16–17, 28–29.

*Primary Examiner*—Patrick P. Garvin
*Assistant Examiner*—William G. Wright
*Attorney, Agent, or Firm*—Grover A. Frater

[57] ABSTRACT

The invention uses plaster, $CaSO_4.H_2O$, in any of its forms. It adds frit in the amount of at least 20 percent by volume of the plaster. That combination, together with water, can be molded like a plaster even though the plaster ingredient is one of the plaster cements that ordinarily is not castable. It sets like plaster. Unlike plaster, the set bodies can be fired and vitrified so that it becomes ceramic. Unlike the raw materials conventionally employed as ceramics, the "green-ware" body need not be dried to leather hardness. Instead, it can be fired immediately while wet, even sopping wet.

12 Claims, No Drawings

CERAMIC COMPOSITION AND METHODS

BACKGROUND

This invention relates to compositions of materials from which to produce ceramic bodies and to the method of producing ceramic bodies from those compositions.

Gypsum is a commonly occuring mineral which is described chemically as the dihydrate of calcium sulfate ($CaSO_4.2H_2O$). If it is heated until about three-fourths of the water of hydration is expelled, the product plaster of Paris is formed. Its formula is $(CaSO_4)_2.H_2O$. When plaster of Paris is mixed with water it sets to a white solid because the dihydrate is reformed as a network of interlacing fibrous crystals. The density, the resistance to chipping, the plasticity and other qualities of plaster of Paris can be altered by altering the temperature employed in the process, called calcining, by which the water of hydration is expelled from the gypsum.

The physical characteristics of the hardened plaster can also be altered by adding a variety of substances. Examples are alum, salt, slcohol, and glue-size. A large number of additive materials and their effects are well known in the art. There are some proprietary plaster mixtures that are identified by trademarks such as "Hydrocal" and "Hydrostone" and "Ultracal". Some of these materials are quite dense and are often referred to as cements. Nonetheless, they are all plaster material and they decompose upon being heated to about 1700° farenheit.

Unlike plasters which set at room temperature, which set without removal of water and can be cast in flexible molds, the raw materials from which ceramic bodies are made must be dried to leather hardness before they can be processed into ceramic materials by being fired at high temperature. The ceramic materials are ordinarily processed in a way that precludes the use of flexible molds because there is a need to draw off water before the clay body can be removed from the mold. Thus, the ceramic bodies are more difficult to process in the initial molding stages than are plaster bodies. On the other hand, the ceramic bodies become vitrified upon being fired and produce much stronger and durable products.

This invention makes it possible to produce a ceramic body using the molding techniques that are applicable to plasters.

SUMMARY

The essential ingredients in compositions that embody the invention are calcined gypsum in one of the forms of plaster of Paris combined with frit. That combination, when water is added, produces a castable material which may be placed in a kiln and fired immediately upon being removed from a mold without any need for drying. It need not be, indeed it may not be, cast in a water-absorbent mold. Like ordinary plaster of Paris, it can be cast in a flexible mold. However, unlike ordinary plaster of Paris, the material of the invention can be fired into a vitrious body. It becomes a ceramic material.

The bare combination of calcium sulfate and frit presents the problem that the ceramic body produced on firing is subject to a considerable degree of shrinking. Depending upon the quantity of water in the original slip the degree of shrinkage may be 15, or even as high as 20, percent. That difficulty is overcome in part by adding a filler material such as sand, talc and other common materials such as grog and asbestos. Sand is preferred because of its lower cost except when a special texture is desired in the finished piece. When fillers other than silacious materials are added, the requirement for frit is increased.

Bodies compounded and fired according to the invention may be glazed using ordinary glazes. The degree of expansion of glaze varies, but the body can be made to "fit" almost any glaze by incorporating a quantity of feldspar in the composition of the body. The feldspar and silica are alternatives in the composition. As the proportion of feldspar is increased the tendency to craze arises. As the proportion of silica is increased the tendency to shiver is increased.

One of the advantages of the invention is that materials calculated to alter the color of the finished ceramic body may be added to the composition without deleterious effects. For example, the addition of chrome oxide, $Cr_2O_3$, will color the body green. That material gives rise to the formation of microscopic bubbles throughout the body which tend to increase its volume and reduce its density. However, the result is a closed cell structure which is non-pourous. The addition of red iron oxide results in a red coloring. The addition of black iron oxide will color the body black. However, the process frees oxygen so that silica should not be used in more than small amounts as a filler when black iron oxide is used as a coloring agent.

Much of the potter's art, and the ceramist's art, and the artificial stone maker's art is empirical and intuitive. It appears that much from those arts is useful in the invention both in the selection of glazes and of texturing materials. In this connection, a number of variations of the basic plaster of Paris material are possible by changes in the calcining procedure and by adding alum, glue-size and other materials. The three basic types of plaster are casting plaster, molding plaster and art plaster. Special processing and additives result in a number of special products like Keen's cement, and such as Hydrocal and Hydrostone. These materials are ordinarily called cements. They are harder than the ordinary plaster. All of these materials appear to be useful in the invention, and they lend to the end product of the invention, after firing, a quality similar to the quality that they have when used as a plaster.

Usefulness of the techniques of the plaster worker do not end there. Molding and casting of materials made according to the invention, employ the processes and techniques of the plaster molding art. However, at that point, the similarity to plaster art ends. Cast bodies made according to the inention may be placed in the kiln for firing while sopping wet. That is different from the plasterman's art in which there is no firing because plaster decomposes in the area of 1700° farenheit.

Firing wet objects is foreign to the ceramist's art. However, from that point on, the technique of firing is substantially the same. Selection of glazes appears to be substantially the same whether the glaze is to be applied after the body has been fired and vitrified and hardened in a second firing or is applied while the body is wet for processing in a single firing. By the addition of larger quantities of frit to the calcium sulfate body, it is possible to produce a product whose surface has the smoothness and gloss of a glazed product.

The objects of the invention are to provide a new composition of material that can be fired into a ceramic body. It is an object to provide material which can be vitrified by firing without a need to wait for the body to dry. The advantage of that is that the processing time is greatly reduced and so is the space required for processing, because neither the time nor the storage area for drying is needed.

Another object is to provide a low cost, easily processed material for those applications in which a hard body is required.

Another very important object of the invention is to provide a material which will fire to a vitrified ceramic form, but which is not subject to the shape limitations that are imposed by the molds that are employed in casting ceramics. The material of the invention can be cast in intricate but inexpensive flexible molds, and to gain that advantage and have a ceramic product is another of the objects of the invention.

The essential ingredients of the invention are plaster and frit. Both leaded and unleaded frits work well. The standard frits numbered 14 and 24 were used in tests made to verify usefulness of the invention. It appears that the quantity of frit that is required is independent of the specific formulation for the plaster. Thus, in the examples set out below, the proportions of frit and plaster remain the same whether the plaster is characterized as an art plaster, a casting plaster, or a molding plaster, or a Hydrostone or Ultrastone or Keene's cement. The product that results from the firing of the inventive compositions will be determined by the character of the plaster that is used in compounding those compositions. Thus, the fired product of the invention will be much more dense if the plaster used was Hydrostone than it is when the base material is number 1 casting plaster.

If the composition includes no more than plaster and frit and water, the fired product can be expected to be somewhat brittle and easily chipped. The cost of the product can be reduced and its durability increased by adding filler material. Suitable materials are those which, like silica sand and talc, include silica and oxygen and form a part of the vitrified structure. Other materials like grog simply become incapsulated in the vitrified body without necessarily forming part of the crystaline structure. If an excess of silica sand is used as a filler, some of it forms an element in the crystaline structure and some of it is simply incapsulated.

Inclusion of the fillers other than the silacious fillers increases the requirement for frit. The flux appears to serve a different purpose that it serves in the ceramic arts. It facilitates vitrification so that it is accomplished at a lower temperature. However, it is not a substitute for the frit. If frit is omitted the body will not vitrify.

There appears to be little difference when practicing the invention between feldspar $K_2O.Al_2O_3.6SiO_2$ and nepheline syenite $K_2O.3Na_2O4Al_2O_3.9SiO_2$. It is useful, when the end product is to be glazed, to use a frit made of that glaze. On the other hand, the proportion of glaze in the formula is sufficiently high so that the density of the glaze has a material effect upon the density of the end product. If a lower density product is desired to minimize freight charges, or some other reason, then alkaline glazes are preferred to the leaded glazes.

Some examples of the invention are set out below. These are formulas of the dry ingredients. They are used by mixing them to achieve uniformity and by adding water and stirring until a consistency is reached which the plaster worker characterizes as a "cream". At that point, the material is poured into a mold and allowed to set in the manner of plaster. When the body has set, the mold is removed and the body is placed in a kiln and fired. These formulations result in the production of a vitrious ceramic body at temperatures in the range of Cone 07 to Cone 04. If the amount of flux is reduced, vitrification will occur at a somewhat higher temperature in the manner with which the ceramist is familiar. All of these formulations, except the last one, specify plaster either in the form of casting plaster or Hydrostone. A lower density product results from the use of casting plaster and the highest density product results from the use of Hydrostone. A product of intermediate density results from the use of a plaster product having a density intermediate casting plaster and Hydrostone. The last example is included to show, as is true, that the plaster can be included in a combination of forms. That example includes equal parts of casting plaster and Keene's cement.

In all of these examples, the proportions are given by volume.

EXAMPLE 1

48 parts plaster as casting plaster or Hydrostone
12 parts frit

EXAMPLE 2

48 parts plaster as casting plaster or Hydrostone
12 parts frit
12 parts feldspar
12 parts talc

EXAMPLE 3

48 parts plaster as casting plaster or Hydrostone
12 parts frit
24 parts feldspar or nepheline syenite
32 parts silica sand

EXAMPLE 4

48 parts plaster as casting plaster or Hydrostone
21 parts frit
24 parts nepheline syenite
30 parts silica sand
2 parts chrome oxide

EXAMPLE 5

48 parts plaster as casting plaster or Hydrostone
18 parts frit
48 parts nepheline syenite
1 part black iron oxide

EXAMPLE 6

48 parts plaster as casting plaster or Hydrostone
18 parts frit
48 parts feldspar
1–2 parts black iron oxide

EXAMPLE 7

48 parts plaster as casting plaster or Hydrostone
15 parts frit
12 parts nepheline syenite
42 parts silica sand
1–2 parts red iron oxide

EXAMPLE 8

48 parts plaster as casting plaster or Hydrostone
19 parts frit 19 parts nepheline syenite
96 parts silica sand

EXAMPLE 9

24 parts casting plaster
24 parts Keene's cement
12 parts frit
12 parts feldspar
12 parts talc or silica sand These formulations are shown in simplified form in the following table to facilitate comparison:

| FORMULA | 1 | 2 | 3 | 4 | 6 | 7 | 8 |
|---|---|---|---|---|---|---|---|
| Plaster | 48 | 48 | 48 | 48 | 48 | 48 | 48 |
| Frit | 12 | 12 | 12 | 21 | 18 | 15 | 19 |
| Flux | —0— | 12 | 24 | 24 | 48 | 12 | 19 |
| Filler | —0— | 12 | 32 | 30 | —0— | 42 | 96 |
| Chrome Oxide | —0— | —0— | —0— | 2 | —0— | —0— | —0— |
| Black Oxide | —0— | —0— | —0— | —0— | 1 | —0— | —0— |
| Red Oxide | —0— | —0— | —0— | —0— | —0— | 1-2 | —0— |

I claim:

1. The composition which comprises:
   a quantity of calcium sulfate plaster and a lesser quantity of frit;
   the volume of frit being no less than 20 percent of the volume of plaster.

2. The invention defined in claim 1 which further comprises quantities of a filler taken from the group consisting of silica sand and talc and quantities of a flux taken from the group consisting of feldspar and nepheline syenite.

3. The invention defined in claim 2 in which the quantity by volume of frit and flux are in the ratio of one part of frit to from one to two parts of flux.

4. A composition defined in claim 1 which contains, by volume, 48 parts of plaster to from 10 to 14 parts of frit and which further comprises from 10 to 14 parts of feldspar and a quantity of filler material.

5. The invention defined in claim 4 in which the filler is silica sand in the amount of 10 to 14 parts by volume.

6. The invention defined in claim 4 in which the filler is talc in the amount of 10 to 14 parts by volume.

7. The composition defined in claim 1 which comprises by volume 48 parts of plaster, 10 to 14 parts of frit, and which further comprises 10 to 26 parts by volume of flux taken from the group consisting of feldspar, nepheline syenite and which further comprises from 30 to 35 parts by volume of one of silica sand and talc.

8. The invention defined in claim 7 which further comprises from one to three parts by volume of chrome oxide and which further comprises an additional quantity of from 10 to 20 parts by volume of frit.

9. The invention defined in claim 7 which further comprises two parts by volume of chrome oxide and an additional quantity of 10 parts by volume of said frit.

10. The invention defined in claim 1 which comprises, by volume, 48 parts of plaster and from 15 to 25 parts of flux from the group consisting of feldspar and nepheline syanite and up to 100 parts by volume of filler taken from the group consisting of silica sand and talc.

11. The composition defined in claim 2 which comprises by volume 48 parts of plaster and from 40 to 45 parts of frit and which further comprises from 10 to 14 parts by volume of flux taken from the group consisting of feldspar and nepheline syenite and from 35 to 45 parts of silica sand and a quantity greater than one part of red iron oxide.

12. The composition defined in claim 1 which comprises by volume 48 parts of plaster and from 15 to 20 parts of frit, and which further comprises from 45 to 50 parts of feldspar and from one to two parts of black iron oxide, said composition being substantially without a silacious filler material.

* * * * *